UNITED STATES PATENT OFFICE.

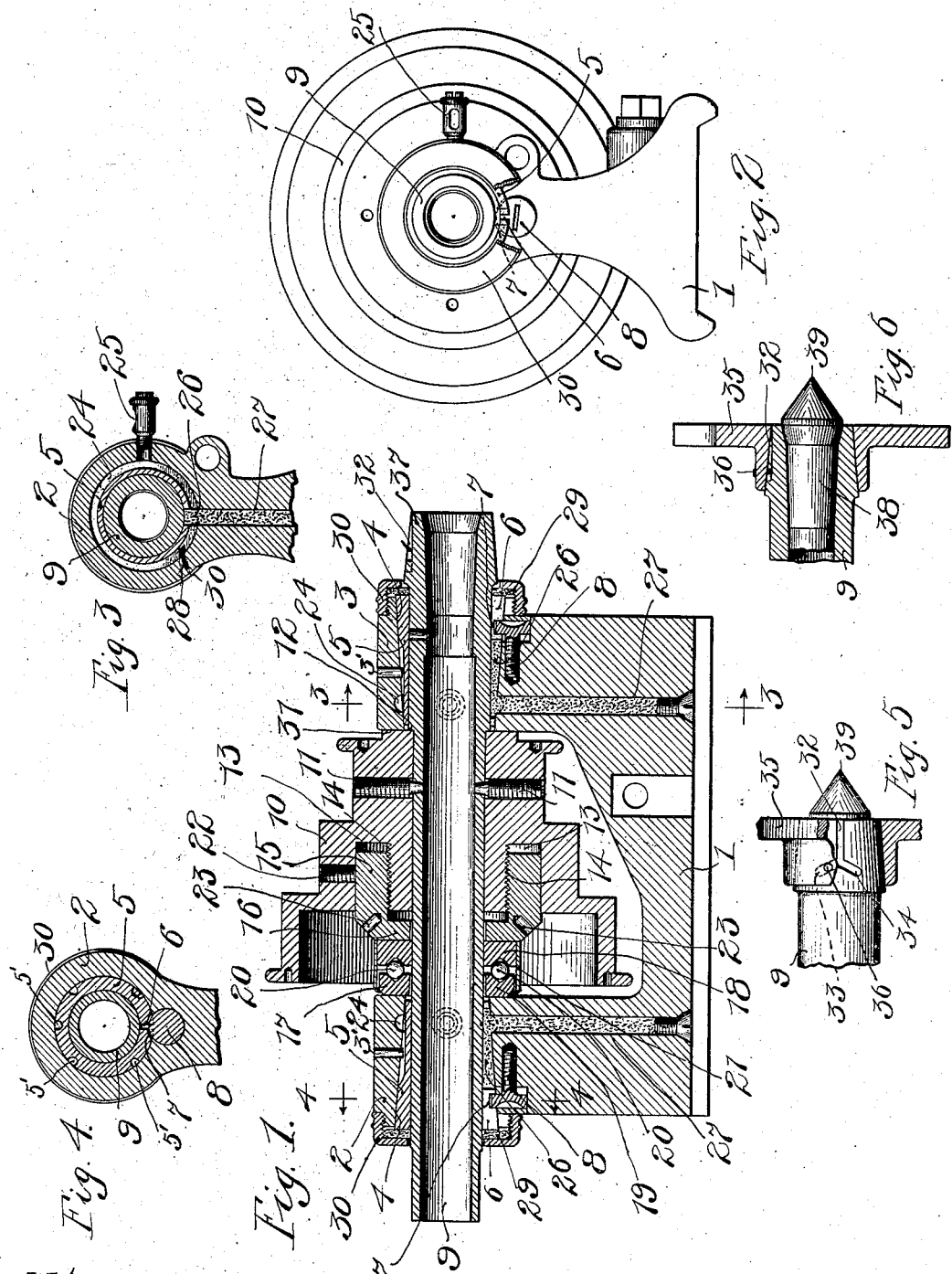

FRANKLIN HARDINGE, OF CHICAGO, ILLINOIS.

LATHE.

No. 894,634.     Specification of Letters Patent.     Patented July 28, 1908.

Application filed November 9, 1903. Serial No. 180,287.

*To all whom it may concern:*

Be it known that I, FRANKLIN HARDINGE, a citizen of the United States, residing at Chicago, in the county of Cook and State of Illinois, have invented a certain new and useful Improvement in Lathes, of which the following is a full, clear, concise, and exact description, reference being had to the accompanying drawings, forming a part of this specification.

My invention relates to lathes and has for its object the provision of an improved lathe head of which the parts are of the simplest and most efficient construction, and in which these parts are so assembled and so interact as to produce greater simplicity, combined with greater efficiency and capacity, than has heretofore been obtained. These objects are obtained by means of a lathe spindle of simplified construction, by the manner in which the spindle is mounted in its bearings, and by the simplified arrangement of the coöperating parts mounted upon the spindle.

My improved spindle is entirely free from threads or other irregularities enabling it to be very readily ground true. Journal bushings are tapered on the outside to fit the correspondingly tapered journal boxes and are parallel on the inside which bears upon the spindle. These bushings have a longitudinal slot, and by means of a single adjusting screw engaging them they can be moved into or out of the journal boxes to be adjusted to snugly fit the spindle to prevent any free play thereof, and at all times keep the spindle in perfect alinement.

The particular features of my invention are the manner of taking up the end thrust on the spindle and the improved manner of adjusting for end shake entirely independent of the spindle. The end thrust is transmitted entirely through solid metal, the cone pulley on the spindle bearing with its front face against the rear of the front bearing housing and against a shoulder on the spindle. An adjusting nut fits snugly into an annular slot in the rear of the pulley hub and is threaded to engage the inner threaded face of the slot. A ball bearing is loosely mounted upon the spindle between the shoulder of the adjusting nut and the rear bearing housing and by turning the adjusting nut the end shake may be adjusted entirely independent of the spindle and the spindle may be withdrawn from the pulley without disturbing the adjustment. The entire end thrust on the spindle is transmitted from the shoulder through the main pulley, the adjustable nut, and the ball bearing, and against the rear journal.

To secure a driving plate or chuck in place on the lathe head, I provide a slot on the nose of the spindle which extends longitudinally and then spirally, and a driving plate or chuck is tapered to fit the taper of the nose and is provided with a pin which engages the slot. As the load increases the plate or chuck is more firmly held on the nose of the spindle, due to the drawing-in action of the pin engaging the spiral slot. With this construction it is unnecessary to remove the plate or chuck from the nose of the spindle as the center pin used in connection with the plate, for instance, may be withdrawn from the spindle and replaced by collets, or the like, without disturbing the plate or chuck. I also employ novel means for oiling the various parts of the lathe, the oil being fed and filtered through wicks placed in the bushing slots. The outer ends of the journal bearings are protected from dirt and grit by felt washers and metal caps, the oil being thus entirely kept free from dirt and keeping all the parts well lubricated for a long time.

The drawing will more clearly illustrate my invention.

Figure 1 is a vertical longitudinal section view. Fig. 2 is an end view thereof. Fig. 3 is a sectional view taken at line 3, 3 of Fig. 1. Fig. 4 is a sectional view taken on line 4, 4 of Fig. 1. Figs. 5 and 6 show an improved manner of mounting a driving plate upon the spindle.

Like characters of reference refer to like parts in the various figures.

The frame 1 supports the journal boxes 2 and 3 provided with inwardly tapering bearings 4. Bushings 5 are tapered on their outside to correspond with the taper of the bearings 4 and are provided, preferably at their under side, with longitudinal slots 6 and recesses 7. Adjusting screws 8 are adapted to engage the frame 1 so that their heads are disposed in the recesses 7. By means of these adjusting screws the bushings may be adjusted inwardly to more snugly fit about the spindle 9, or they may be withdrawn from the bearings to allow freer play of the spindle. These bushings are preferably of spring material, such as cast iron, and are contracted in diameter (in practice, about .010 of an inch) when first set in proper position about the spindle. This gives them a natural tendency to be closely hugged by the bearings 4 at all times. The bushings are also provided with peripheral grooves 5', 5' and pins 3' extend through the journals 3, to engage the upper groove to prevent turning of the bushings. The screw-heads by engaging on either side of the slots 6, also prevent twisting of the bushing. By means of this double adjustment feature, the spindle may be quickly and readily brought to true alinement and the bushings may be quickly removed and replaced without disassembling the other parts of the lathe. As the bushings are parallel on the inside which bears on the spindle, sufficient end shake may be allowed to cause the lathe to run freely without affecting the alinement or causing binding as in other lathes where such bushings have been more or less tapered. A cone pulley 10 is mounted upon the spindle and held in place thereon by means of set screws 11. The forward end of the cone pulley bears against the front journal 3 and engages a shoulder 12 on the spindle 9. The set screws 11 taper at their lower end and as they engage the spindle, they draw and maintain the cone pulley tightly against the shoulder 12. At the rear of the hub of the cone pulley is an annular recess 13 which is provided with threads 14 upon its inner surface. A threaded adjusting nut 15 fits closely into the said recess and engages threads 14. This adjusting nut has an annular shoulder 16, between which shoulder and the rear journal 2 is disposed a ball bearing 17, the forward cone 18 of which snugly but slidingly fits the spindle, while the rear cone 19 loosely surrounds the spindle, the balls 20 being disposed between the cones, and protected by a housing 21. The end shake of the lathe can now be perfectly adjusted by means of the adjusting nut 15, which, after the proper adjustment has been obtained, may be secured in position by a set screw 22. Holes 23, 23 are slanted and by means of lever pins inserted therein, the adjusting nut may be readily turned any distance. As the adjusting nut snugly fits the longitudinal annular recess 13, the shoulder 16 thereof bearing against the ball bearing, will always run true no matter how far the nut is turned. Being also entirely independent of the spindle, the spindle may be removed without disturbing the adjustment in the least. Also by this disposition of the adjusting nut, the entire bearing surface of the pulley on the spindle is retained.

The ball bearing takes up all the end thrust of the lathe and there is a continuous body of metal from the nose of the spindle to the ball bearing, all the end thrust on the spindle being transmitted from the shoulder 12 through the pulley, the adjusting nut and the ball bearing, and against the rear journal 2, and consequently there can be no binding which would result were such end thrust taken up by tapered bearings. The losses due to friction between the various parts is thus reduced to a minimum, giving the lathe a greater capacity and a longer life. The spindle being free from threads and substantially entirely cylindrical can very readily be ground exactly true, and by merely withdrawing the set screws 11, the spindle can be drawn forward to practically disassemble all the parts of the lathe head without disturbing any of the adjustments. Furthermore, the ball bearing which I employ merely slips over the spindle, requiring no special construction, and can be bought finished on the market.

I employ novel means for lubricating the engaging surfaces of the lathe, and to prevent wearing of these parts on account of dirt and grit, I cause the lubricating oil to be filtered. As best shown at Fig. 3 an annular channel 24 is provided upon the interior of each journal, and an oil cup or inlet 25 passes through the wall of the journal and communicates with said channel. The slots 6 at the under side of the bushings may be widened at their middle portion, and wicks 26 of filtering material fill these widened slots, and also extend downwardly into the wick chamber 27. It will thus be seen that the oil 28 before it can reach the bearing surface must pass through the wick 26, and thus all dirt and grit is filtered from the oil, and only clear oil reaches the bearing surface, consequently reducing the wear to a minimum. Felt washers 29 encircle the spindle at the outer ends of the bearings and by means of metal caps 30 are clamped against the bearings to prevent access of dirt to the bearings from the outside. It is unnecessary to provide special oiling means for the ball bearings or for the bearing surface 31 between the front of the pulley and the forward journal, as sufficient oil creeps along the spindle to keep these parts lubricated. By means of the adjusting nut 15, the bearing surface 31 may be made very close and thus prevent access of dirt or grit, and the protecting housing 21 prevents any dirt from reaching the ball bearing.

In Figs. 5 and 6 I show improved means for attaching a driving plate or chuck to the lathe spindle. I provide a slot 32 which extends parallel to the axis of the spindle, which slot branches into slots 33 and 34 which extend rearwardly and spirally. The driving plate 35 instead of screw threading on to the tapered nose of the spindle is provided with a pin 36 extending through the hub thereof. As the plate is applied to the nose 37 of the spindle, the pin 36 is caused to engage and to pass along the slot 32, whereupon the plate is given a turn either to the right or left, according to the direction of subsequent rotation thereof, whereupon the pin enters a spiral slot, the wedging action of which draws the plate into clamping engagement with the spindle nose. A centering arbor 38 may be secured in the spindle in the usual manner. This manner of applying a driving plate brings the centering pin 39 as close as possible to the rigid nose of the spindle, which eliminates error in the centering of the machine.

I thus produce a lathe head having a minimum number of parts which parts are of such simple construction as to be very readily disassembled for cleaning or repair purposes, and which can readily and quickly be replaced without affecting the adjustment or the alinement of the lathe.

As changes may readily be made in the various parts and in their coöperation without departing from the scope of the invention, I do not wish to be limited to the exact construction shown and described, but

I claim as new and desire to secure by Letters Patent the following claims:

1. In a lathe head, the combination with front and rear bearings, of a lathe spindle disposed in said bearings and cylindrical within and at each side of said bearings and of a diameter not greater than that of the bearings, a cone pulley secured to said spindle between said bearings, and a ball bearing free from threaded engagement and loosely mounted upon said spindle and bearing against the rear end of said cone pulley and the front side of the rear bearing, the entire end thrust of the spindle being transmitted to the rear bearing through the pulley and ball bearing.

2. In a lathe head, the combination with a lathe spindle, of front and rear bearings for supporting said spindle, a cone pulley secured to said spindle and bearing at its forward end against the rear of the front bearing housing, an adjusting nut independent of said spindle engaging the rear of said cone pulley, and a ball bearing loosely mounted on said spindle and bearing against the rear of said adjusting nut and the front side of the inner bearing, substantially as described.

3. In a lathe head, the combination with front and rear bearings, of a lathe spindle disposed in said bearings, a cone pulley secured to said spindle, the forward end of said pulley bearing against the rear of the front bearing housing, an adjusting nut engaging a threaded annular recess at the rear of the cone pulley hub, and a ball bearing mounted upon said spindle and bearing against the rear end of said adjusting nut and the front side of the rear bearing, substantially as described.

4. In a lathe head, the combination with front and rear bearings, of a lathe spindle disposed in said bearings, said spindle being substantially cylindrical within and each side of said bearings and of a diameter not greater than that of the bearings, a shoulder at the forward end of said spindle, a cone pulley secured on said spindle and engaging at its forward end with said shoulder and the rear face of the front bearing, and a ball bearing loosely mounted upon said spindle between the rear end of said pulley and the rear bearing, the entire end thrust of the lathe being transmitted through said shoulder, said pulley and said ball bearing against the rear bearing housing.

5. In a lathe head, the combination with front and rear bearings, of a spindle disposed in said bearings, said spindle having a diameter not greater than that of the bearings for at least a portion thereof adjacent each end of said bearings, a cone pulley rigidly mounted upon said spindle between said bearings, a ball bearing loosely mounted upon said spindle between said pulley and the rear bearing, and an adjusting nut screw-threaded into the rear of said pulley and engaging said ball bearing, the entire end thrust of the spindle being transmitted through said pulley and said ball bearing against the rear bearing housing.

6. In a lathe head, the combination with front and rear bearings, of a lathe spindle entirely free from threads and of a diameter not greater than that of the bearings for at least a portion thereof adjacent each end of said bearings, a ball bearing slidably mounted upon said spindle between said pulley and the rear bearing of the lathe head and longitudinal adjusting means between the rear of said pulley and said ball bearing.

7. In a lathe head, the combination with front and rear bearings, of a lathe spindle disposed in said bearings, a cone pulley secured to said spindle between said bearings, a ball bearing mounted upon said spindle between said cone pulley and the rear bearing, and end shake adjusting means between and engaging said cone pulley and said ball bearing, the entire end thrust being communicated to the rear bearing through the pulley, the adjusting means and the ball bearing.

8. In a lathe head, the combination with front and rear bearings, of a lathe spindle disposed in said bearings, a cone pulley secured on said spindle between said bearings, a ball bearing loosely mounted upon said spindle between said cone pulley and the rear bearing, and end shake adjusting means disposed between said ball bearing and said pulley, said adjusting means being carried by the pulley, substantially as described.

9. In a lathe head, the combination with a lathe spindle, of front and rear bearings for supporting said spindle, a cone pulley secured to said spindle between said bearings, and an end shake adjusting nut carried by said pulley and disposed between said pulley and one of the bearings.

10. In a lathe head, the combination with a lathe spindle, of front and rear bearings for supporting said spindle, a cone pulley secured to said spindle between said bearings, an end shake adjusting frame independent of said spindle and carried by the pulley to be disposed between said pulley and one of the bearings, said frame being longitudinally adjustable on said pulley.

11. In a lathe head, the combination with front and rear bearings, of a spindle supported in said bearings and free to slide longitudinally therein, a cone pulley secured to the spindle between the bearings, with its front end bearing against the rear face of the front bearing housing, and an abutment frame carried by said pulley and longitudinally adjustable thereon, said frame being disposed between the other bearing housing and the pulley whereby the end thrust on the spindle is all transmitted through the pulley and frame to the rear bearing housing.

In witness whereof, I hereunto subscribe my name this 6th day of November A. D., 1903.

FRANKLIN HARDINGE.

Witnesses:
CHARLES J. SCHMIDT,
HARVEY L. HANSON.